United States Patent [19]

Carlock et al.

[11] 4,379,678
[45] Apr. 12, 1983

[54] INDIVIDUAL BLADE CONTROL

[75] Inventors: Gaylord W. Carlock, Joshua; Jimmy G. Garner; Charles M. Gatlin, both of Hurst; Kenneth F. Guinn, Fort Worth; Peter A. Reyes, Watauga, all of Tex.

[73] Assignee: Textron, Inc., Providence, R.I.

[21] Appl. No.: 194,804

[22] Filed: Oct. 7, 1980

[51] Int. Cl.³ .............................. B64C 27/74
[52] U.S. Cl. ............................ 416/98; 416/31; 416/158
[58] Field of Search ............... 416/98, 114, 158, 31, 416/155, 156, 48; 244/17.11, 17.13, 17.25

[56] References Cited

U.S. PATENT DOCUMENTS

| | | | |
|---|---|---|---|
| 2,491,260 | 12/1949 | Green | 416/98 |
| 3,227,221 | 1/1966 | You | 416/48 |
| 3,256,780 | 6/1966 | Riley et al. | 416/114 X |
| 3,767,323 | 10/1973 | Zech | 416/114 X |
| 4,027,999 | 6/1977 | Durno | 416/114 X |
| 4,243,358 | 1/1981 | Carlock et al. | 416/114 |
| 4,274,808 | 6/1981 | Garner | 416/114 |
| 4,348,155 | 9/1982 | Barnes et al. | 416/48 X |

FOREIGN PATENT DOCUMENTS 995459  12/1951  France ..................... 416/115

Primary Examiner—Everette A. Powell, Jr.
Attorney, Agent, or Firm—Richards, Harris & Medlock

[57] ABSTRACT

Individual blade control of a helicopter rotor is accomplished by rotation of a mast (10) about a standpipe (12) where an individual blade (16) is coupled to the mast through a hub (18). Pilot input signals are transmitted by fly-by-optic transmission lines (14) through a fiber optic slip ring (40,42) to signal generators (134, 136, 138) for each of three sections of triplex actuators (76-79) coupled to individual rotor blades. Hydraulic fluid for positioning each of the actuators (76-79) is provided by electrohydraulic power packages (88, 90 and 92) where each package includes a pump and alternator. As each blade rotates about the mast (76) the pitch angle changes by individualizing the output of the signal generators (134-138) for each actuator.

19 Claims, 8 Drawing Figures

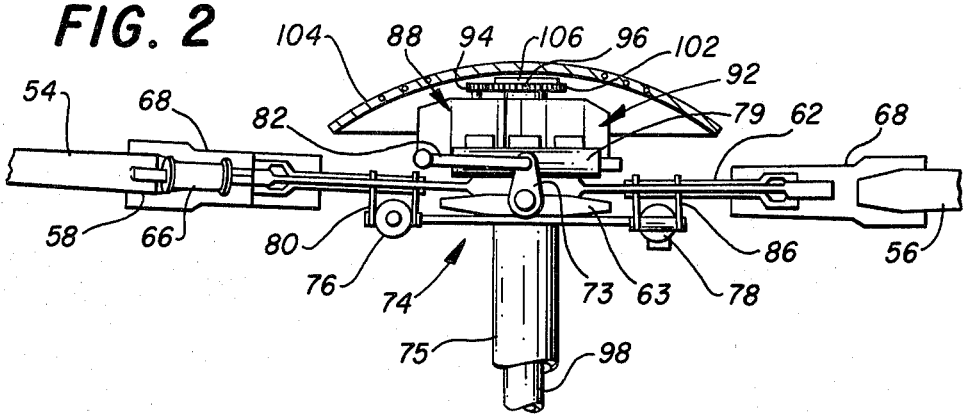
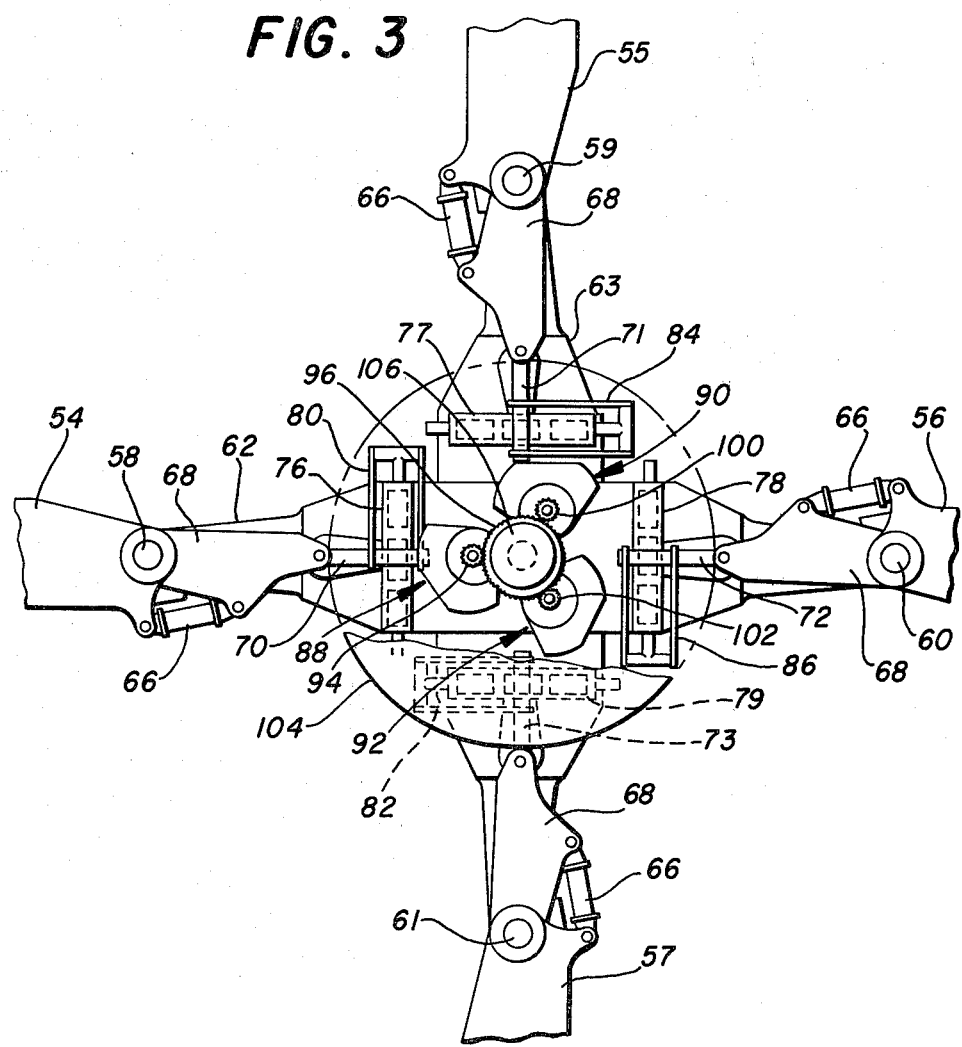

INDIVIDUAL BLADE CONTROL

TECHNICAL FIELD

This invention relates to control of a propeller, rotor, or prop/rotor, and more particularly to individual blade pitch control.

BACKGROUND ART

Although the invention described and claimed herein is primarily directed to individual blade control of a rotor of rotary wing aircraft, it also finds application for use with propellers in a prop-fan configuration.

A review of the evolution of helicopter main rotor design reveals that, while there have been marked changes in the design of the rotor blades and their interconnection to the rotor hub, little has been accomplished to achieve blade feathering (pitch) control. The conventional rotor blade feathering or pitch control still utilizes the complex mechanical swashplate to provide the interface between rotating and non-rotating segments of the system. While progress in the area of helicopter main rotor flight controls has been practically non-existent, there have been many good reasons for this lack of progress. It has been only in the last few years that computer technology is available for such control situations and that fiber optics have been developed to assume certain fly-by-wire tasks heretofore accomplished only by sliding metal slip rings. It is only as the result of recent technological breakthroughs and advancements in many areas that enables reconsideration of the design of main rotor flight control and the radical departure from familiar control arrangements.

Heretofore, in the case of helicopter rotors, both cyclic and collective pitch is achieved by use of a swashplate in connection with hydraulic actuators which are mechanically controlled. Helicopters are generally equipped with mechanical linkages leading from pilot control sticks to the hydraulic actuator inputs to control the location and attitude of the swashplate. The swashplate is coupled to pitch horns on the rotor blades to control both cyclic and collective pitch. Variations in cyclic pitch are produced by tilting the swashplate and variations in collective pitch are produced by raising and lowering the swashplate. The position and attitude of the swashplate are usually controlled by three hydraulic actuators connected to three points on the swashplate. Although historically, mechanical linkages interconnect the pilot control sticks to the actuators, recent developments have incorporated the use of electrical sensors to sense pilot inputs for producing control signals for servo systems, which, in turn, drive electrohydraulic actuators coupled to the swashplate.

The swashplate and associated linkages, in addition to the actuators, require a considerable amount of space in the aircraft and account for a substantial amount of additional aircraft gross weight. In the case of military aircraft, the extensive mechanical linkages and mechanisms for controlling the swashplate, in cyclic and collective pitch, increase the danger of damage by enemy fire. Thus, there is a continuing effort to improve blade pitch control for helicopter rotors and for propellers in a prop-fan configuration.

In accordance with the present invention, the conventional complex mechanical swashplate is eliminated from the main rotor flight controls thereby providing the potential for improvements in reliability and maintainability. The apparatus described herein provides a two-fail-operate system that integrates actuators, power supplies and control logic into the rotating system. Individual blade control is most effective in terms of reduction in both linkage and power required with any apparatus of the present invention.

DISCLOSURE OF THE INVENTION

In accordance with the present invention, there is provided apparatus for individual blade control wherein the blades are driven by means of a rotating mast through a hub rotating with the mast. A plurality of blade actuators are mounted to rotate with the hub and individually coupled to one blade for control thereof. Also mounted to rotate with the hub is a plurality of power units each individually actuated by rotation of the hub to provide actuator power and control signals. Control paths connect the control signals from each power unit to each blade actuator to control blade pitch.

Further, in accordance with the present invention, there is provided apparatus for individual blade control of a rotor of a helicopter having a mast which drives the rotor through a rotating hub. A plurality of blade actuators are mounted to rotate with the hub and are independently coupled to a rotor blade for control thereof. Each actuator has a plurality of control sections individually controlled along with the same section of other actuators. Power units are mounted to rotate with a hub and provide control signals to each actuator section for each of the plurality of blade actuators. Control signals from the power units are connected by means of blade individualizing paths to the individual sections of the plurality of actuators in accordance with pilot commands.

Also in accordance with this invention, active control of individual rotor blades is achieved by individually characterizing the control signals applied to the actuators of the individual rotor blades. The use of active control of individual rotor blades makes for improved rotor operation.

BRIEF DESCRIPTION OF THE DRAWINGS

A more complete understanding of the invention and its advantages will be apparent from the following detailed description taken in conjunction with the accompanying drawings.

Referring to the drawings:

FIG. 2 is a side view, partially cut away, of the rotor hub and mast with an enclosing spinner;

FIG. 3 is a top view of a four bladed main rotor of a helicopter with the spinner shown by dotted outline;

DETAILED DESCRIPTION

Figure 1:
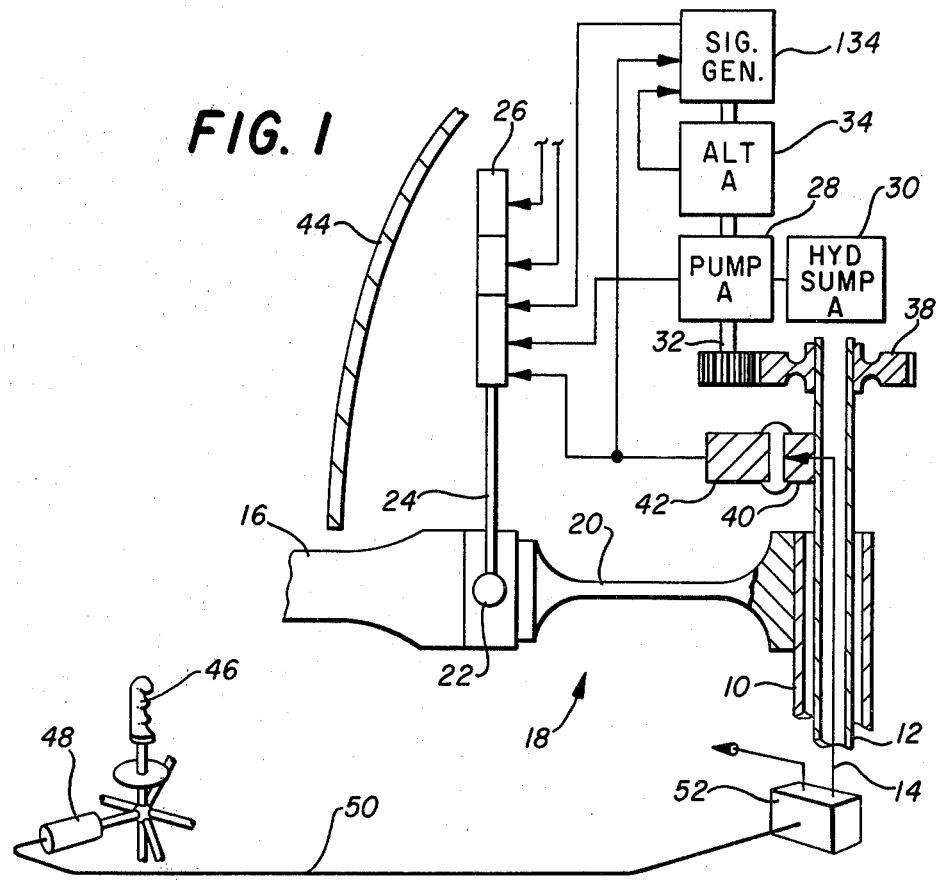
FIG. 1 is a schematic of a fly-by-optic triplex control system for providing signals to apparatus for individual blade pitch control of the main rotor of a helicopter.

Referring to FIG. 1, there is schematically shown an individual blade pitch control system, in accordance with the present invention, for controlling the pitch of each blade of a main rotor of a helicopter to which the apparatus of the present invention is attached. Conventionally, the main rotor of a helicopter includes two or four blades each of which are controlled as the rotor rotates in azimuth to produce the necessary lift and forward thrust motion of the helicopter. A mast 10 is driven to rotate by a conventional power plant mounted to the top of the fuselage. The mast 10 is a hollow tube and mounted concentric therewith is a standpipe 12 which is fixed in position relative to the fuselage and therefore the mast rotates about the standpipe. Passing through the center of the standpipe 12 is a fiber optic bundle (transmission path) 14 comprising the transmission portion of a fly-by-optic control system, and in the present invention, a triplex control system. The fiber optic bundle 14 transmits blade control signals by means of light pulses to individual controllers for the actuators of each blade 16 (only one shown in FIG. 1) of the main rotor.

Mounted to rotate with the mast 10 is a rotor hub 18 including flapping elements 20 for each of the blades 16. Each of the blades 16 of the main rotor is attached to one of the flapping elements 20. The blade 16 includes a pitch horn 22 coupled by means of drive linkage 24 to a triplex electrohydraulic actuator 26. Thus, there would be one triplex actuator 26 for each blade of the main rotor.

Each triplex (three section) actuator is hydraulically powered and controlled by electrical signals. The choice of the actuator configuration (tandem, parallel, etc.) will vary with the rotor configuration. As illustrated, each triplex actuator 26 contains three hydraulically independent, mechanically connected pistons, each piston a part of a separate section. During normal operation, all three hydraulic pistons are available to provide power for blade pitch control. In the event of a failure (the system is a two-fail-operate system), any one of the independent sections of the actuator 26 is capable of providing pitch control for the interconnected blade 16.

Also mounted to the rotor hub 18 to rotate therewith are three separate electrohydraulic power packages to supply pressurized fluid and control signals to each of the three sections of the actuator 26. Each power package, only one shown in FIG. 1, is self-contained and independent of the other two systems. Each package contains a pump 28, a reservoir 30 and associated filters, relief valves and all other auxiliary equipment required for hydraulic power generation for each of the actuators of the main rotor. The pump 28 is mounted on a common shaft 32 with an alternator 34 which supplies electrical power for operation of one of the separate hydraulic systems. Thus, each power package includes its own alternator 34 thereby providing two-fail-operate redundancy in the power generation section. Also included in each of the power packages is a signal generator 134 that responds to pilot inputs and generates control signals synchronized to the position of the rotor hub 18. The hydraulic pump 28, the signal generator, and the alternator 34 are driven through a spur gear 36 which is in engagement with a drive gear 38 fastened to the upper end of the standpipe 12. The drive gear 38 is in a fixed position relative to the spur gear 36 which rotates with the hub 18 at the speed of the mast 10.

Also mounted to the standpipe 12 is the non-rotating element 40 of a fiber optic slip ring for transmitting pilot control signals to the rotating hub 18. A rotating element 42 rotates with the hub 18 and receives the light pulse signals for conversion into electrical signals in the signal generators. Basically, the fiber optic slip ring consists of a fiber optic bundle that transmits signals from the non-rotating element 40 to the rotating element 42. The element 42 likewise comprises a fiber optic bundle. In operation, light signals are transmitted through the fiber optic bundle of the element 40 across an air space to matching fiber optic bundles of the rotating element 42. These light signals are input to the signal generators 134 that produce electrical control signals to electrohydraulic servo valves for varying the pitch of the blade 16 as it rotates with the mast 10.

As illustrated, signals from the rotating element 42 and electrical power from the alternator 34 are coupled to the signal generator 134. The pump 28 and the signal generator 134 are interconnected to one section of the actuator 26. Lines connected to the other two sections of the actuator 26 are controlled from separately electrohydraulic power packages as part of the rotating hardware mounted to the hub 18. The hub 18, along with the control apparatus as described, is enclosed within a spinner 44 which provides a heat exchanger for cooling the hydraulic fluid of each of the hydraulic systems as will be explained.

Each of the actuators for the blades 16 are controlled by pilot inputs derived from a control stick 46 which, for illustrative purposes, is shown providing control signals for the fore/aft axis (F/A), the lateral axis (LAT) and collective control (COLL) to the signal generators for pitch control of rotor blades 16. There are three separate sets of signals F/A, LAT, and COLL generated by the control stick 46. More particularly, a sensor 48 is utilized as the blade position sensors with the sensors for each of the other signals for control of the rotor not being shown. Sensor 48 is responsive to commands introduced by way of the stick 46 and preferably is an optical sensor to provide on a fiber optic channel 50, a command to control the sections of an actuator 26. The fiber optic channel 50 terminates in a control module 52 providing an output in the form of optical pulses transmitted over the fly-by-optic bundle (transmission path) 14.

Conventional systems for control of a rotor blade actuator in response to pilot commands are well-known. While fiber optics have been indicated as desirable, it will be understood that conventional systems heretofore used may be employed in the present invention. It is to be understood that the present invention involves redundancy of actuator sections for each rotor blade and a separate power package for each section of the rotor blade actuators. The sections of each actuator are independent of one another except for failure logic which is used to link them in a controlled interplay.

Preferably, each actuator section is controlled by a completely independent signal path. Each path begins at the stick 46 where there is a sensor for each section. The rotor blade position command signals are transmitted from the sensors to the control module 52 where there may be one control module for each path. Each control module then controls one section which is a part of an integrated actuator package. Each actuator is powered electrically and hydraulically from all of the electrohydraulic power packages, that is, each section of an actuator is powered by a separate electrohydraulic power package. Each signal path is thus independent from signal generation and transmission to power generation to control output for a rotor blade.

Referring to FIGS. 2 and 3, there is shown one hardware implementation of the individual blade pitch control apparatus of FIG. 1 for a four bladed main rotor of a helicopter. Each of the rotor blades 54–57 is coupled, respectively, through a lead lag hinge 58–61 to one of the yoke assemblies 62 or 63. A shock absorber 66 is connected between each blade and a blade extension 68. At the end of each blade extension 68 for the blades 54–57, respectively, there is a pitch horn 70–73.

Each of the flexure members of the yoke assemblies 62–63 terminates at an inner-most end in a rotor hub 74 attached to rotate with a mast 75. Supported to rotate with the hub 74 are triplex hydraulic actuators 76–79 respectively, coupled to the pitch horns 70–73 for each of the rotor blades 54–57. Specifically, the triplex actuator 76 is coupled to the pitch horn 70 by means of drive linkage 80. Drive linkage 84 connects the output motion of the triplex actuator 77 to the pitch horn 71 for the rotor blade 55 while the rotor blade 56 is connected to the actuator 78 through drive linkage 86. Drive linkage 88 connects the actuator 79 to the pitch horn 73 for the rotor blade 57.

Also mounted to rotate with the hub 74 are three separate and independent electrohydraulic power packages 88, 90 and 92. As described with reference to FIG. 1, each electrohydraulic power package includes an alternator for generating electrical power, a signal generator for providing control signals, and a hydraulic pump. A drive gear 94 for the electrohydraulic power package 88 engages a stationary gear 96 connected to the top of a standpipe 98. Similarly, a drive gear 100 for the power package 90 engages the stationary gear 96 and a drive gear 102 for the power package 92 also engages the stationary gear. As the hub 74 rotates with the mast 75, the engagement of the drive gears 94, 100 and 102 with the stationary gear 96 provides rotating mechanical motion to each of the electrohydraulic power packages 88, 90 and 92.

Plumbing from each of the hydraulic sections of the power packages 88, 90 and 92 to the actuators 76–79 is routed through a multi-purpose hub spinner 104 which includes cooling passages for hydraulic fluid and also serves as a cover for the controls and power packages. In addition, the spinner 104 acts as a fairing for drag reduction. By the utilization of quick disconnect hydraulic fittings between the spinner 104 and various hydraulic components of the system of FIGS. 2 and 3, fast removal of the spinner is possible for inspection, maintenance and overhaul.

As was described with reference to FIG. 1, pilot inputs for the actuators are transmitted up the hollow center of the standpipe 98 on fly-by-optics transmission to optical slip ring 106. Control signals, generated from pilot inputs and airframe sensors are input to electrohydraulic servo valves. The control signals then position each of the actuators 76–79.

Figure 4:
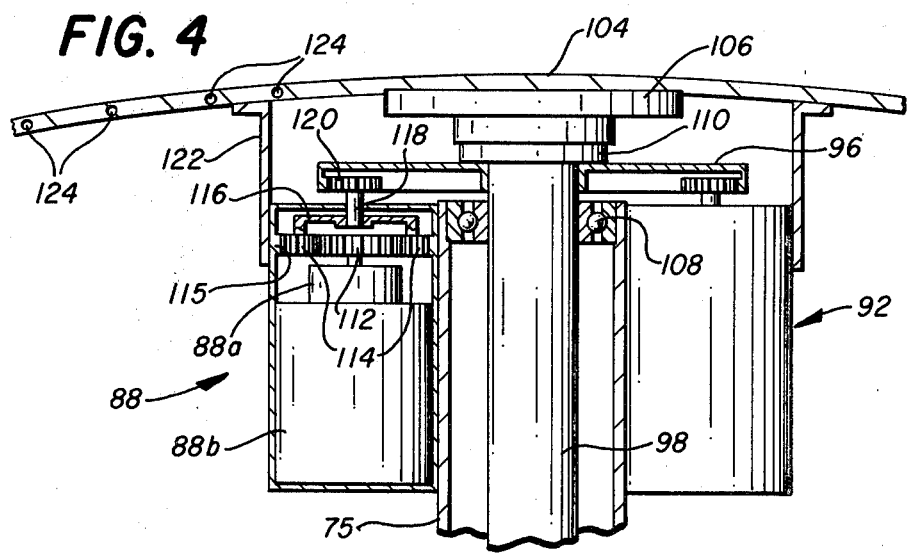
FIG. 4 is a detailed diagram of the mast top and a stationary standpipe with gear coupling for powering a plurality of power units each including a power generator and hydraulic pump in a unitary configuration.

Referring to FIG. 4, there is shown a detail of the gear drive train for coupling each of the electrohydraulic power packages 88, 90 and 92 to the stationary gear 96. The standpipe 98 extends up the mast 75 and is supported in relationship thereto by means of a bearing 108. The optical slip ring 106 is shown fastened to a flange 110 at the top of the standpipe 98. Press fit onto the standpipe 98 is the stationary gear 96 illustrated in the form of an internal ring gear.

Mounted to rotate with the mast 75 is the electrohydraulic power package 88 including both the alternator section 88a and the hydraulic section including a pump integrated with a reservoir, filters and pressure valving. Connected to the output shaft of the power package 88 is a spur gear 112 that is in engagement with three gears 114 (only two shown) mounted to rotate on shafts extending from a cage 116. The cage 116 includes a shaft 118 having a fixed relationship with respect to the cage. The three gears 114 not only engage the spur gear 112, but also a stationary ring gear 115 fastened to the inner wall of the housing for the power package 88. Connected to the shaft 118 is a drive gear 120 that engages the ring gear 96. The gearing for coupling the output of the electrohydraulic power package 88 to the stationary ring gear 96 is conventional.

Each of the electrohydraulic power packages 90 and 92 (power package 90 not shown in FIG. 4) is similarly driven through a gear train as illustrated and described with reference to the power package 88. Operationally, as the mast 75 rotates, the power packages 88, 90 and 92 rotate therewith which causes the drive gear 120 to rotate with reference to the stationary ring gear 96. Rotation of the drive gear 120 is transmitted through the cage 116 to the gears 114 which, in turn, rotate the spur gear 112 and, in turn, the alternator 88a and the pump 88b.

With reference to FIG. 4, the spinner 104 is shown supported from the power package 88 by means of a bracket 122. Similar support for the spinner 104 is also provided from other components of the individual blade pitch control apparatus as detailed in FIG. 4. Formed within the spinner 104 are fluid cooling passages 124 which are coupled between the actuators 76–79 to return fluid to the power packages 88, 90 and 92.

Figure 5:
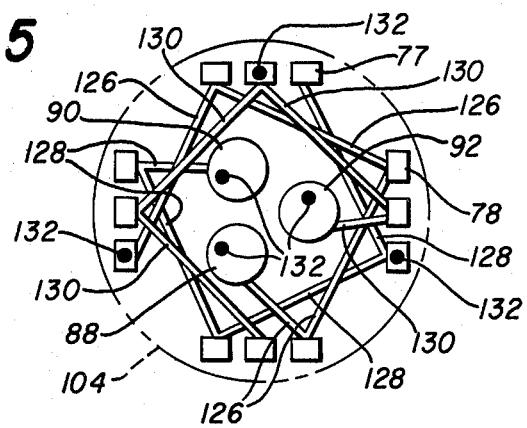
FIG. 5 is a schematic view of the plumbing for providing pressurized hydraulic fluid from each of three hydraulic pumps to one section of triplex actuators for each of the four blades of the rotor of FIG. 3.
Figure 6:
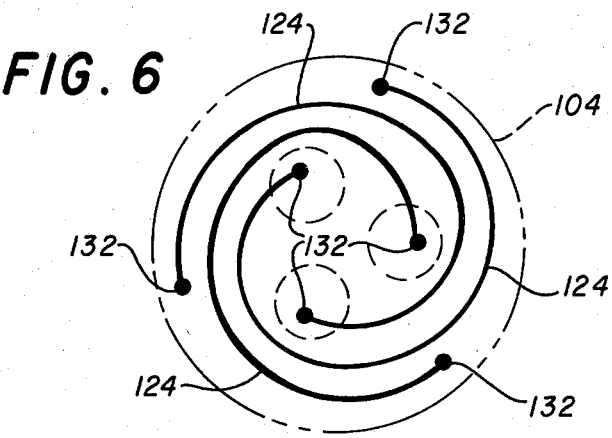
FIG. 6 is a schematic illustration of the flow paths through the spinner for hydraulic fluid cooling.

Referring to FIGS. 5 and 6, there is schematically shown a plumbing arrangement from each of the power packages 88, 90 and 92 to each of the actuators 76–79. Pressurized fluid from the power package 88 is transmitted to the third section of each of the actuators 76–79 by means of piping 126. A plumbing arrangement from the power package 90 to the first section of each of the actuators 76–79 is shown by piping 128 with piping 130 connecting the power package 92 to the second section of each of the actuators. Note that the electrohydraulic servo valves for controlling each section of the actuators 76–79 is a part of each actuator section and may be any one of several commercially available electrohydraulic servo valves. Thus, the fluid is piped to each of the sections of the actuators where electrical control signals actuate the servo valves to apply the fluid to the sections of the actuators.

Return fluid from the actuators back to the power packages 88, 90 and 92 is, as explained, through the spinner 104 with a typical pattern for the passages 124 shown in FIG. 6. Each of the connectors 132 is of a quick disconnect design that enbles fast removal of the spinner for inspection and overhaul of the individual blade pitch control apparatus. The mating portion of the couplings 132 is schematically illustrated in FIG. 5.

Figure 7:
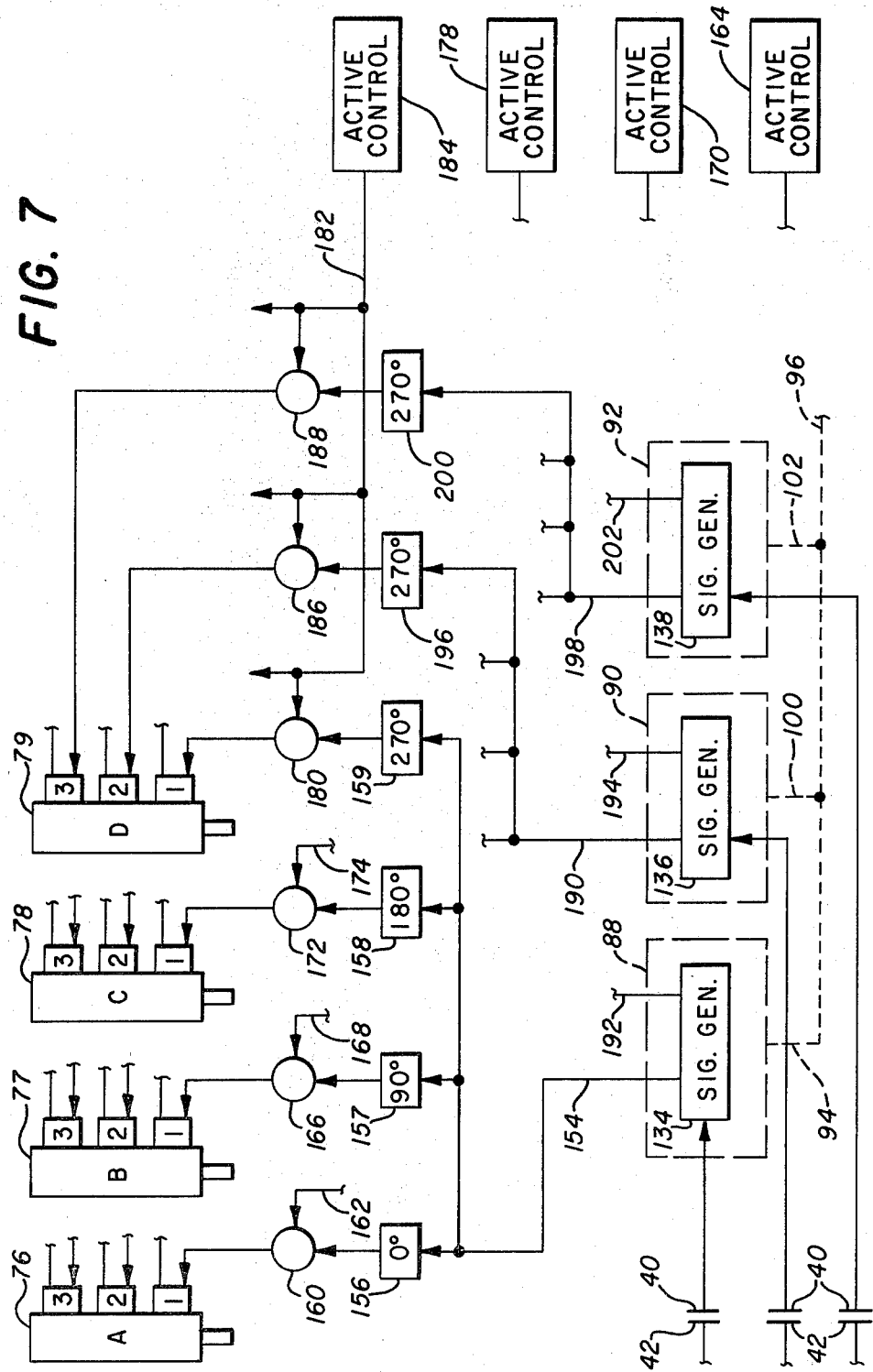
FIG. 7 is a schematic diagram of the electrical system for each blade of the rotor of FIG. 3 and responsive to optically received pilot input signals.

Referring to FIG. 7, there is shown a block diagram of a control system for energizing each of the triplex actuators 76–79 in accordance with pilot input signals transmitted through the fiber optic slip ring 106. These pilot control signals are typically the fore and aft signal (F/A), a lateral axis signal (LAT), and a collective pitch signal (COLL). These signals are multiplexed together in the module 52, FIG. 1, and are transmitted across the optical slip ring 40-42. Three separate multiplexed signals are transmitted along three separate paths, along the transmission fiber optic bundle 14 through the fiber optic slip ring to individual signal generators 134, 136 and 138, respectively, attached to and functioning with the electrohydraulic power packages 88, 90 and 92. As schematically illustrated, each of the power packages 88, 90 and 92 is mechanically coupled by means of the gears 94, 100 and 102 to the drive gear 96. Thus, there are three separate signal generators each receiving separate but similar pilot input signals through the fiber optic slip ring. Each of the signal generators converts the optical digital pulses into electrical pulses for processing into control signals to the actuators 76-79.

Figure 8:
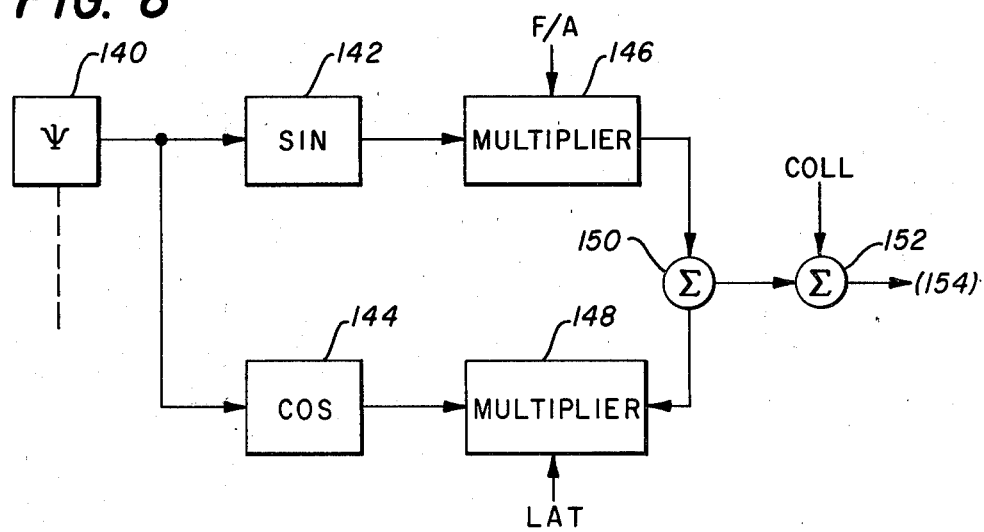
FIG. 8 is a block diagram of a circuit in the signal generators of FIG. 7.

Referring to FIG. 8, there is shown a block diagram of a circuit for responding to the pilot input signals and generating control signals for the triplex actuators 76-79. Each of the signal generators 134, 136 and 138 comprises two such circuits, as illustrated in FIG. 8, to provide a dualized output to each of the electrohydraulic servo valves for the three sections of the actuators 76-79. For the system of FIG. 7, six circuits, as illustrated in FIG. 8, would be required to provide the dual signals to each of the three electrohydraulic servo valves for each of the four triplex actuators 76-79.

A rotor position generator 140, rotating with the shaft 118 of an electrohydraulic power package, generates an output signal and varies with the location of each rotor blade as it rotates with the mast 75. This rotor position synchronized signal ($\Psi$) is applied to an input of a sine generator 142 and a cosine generator 144. The signal "sin $\Psi$" from the generator 142 is input to a multiplying amplifier 146 that also receives the decoded F/A signal from the pilot control stick. Similarly, the "cos $\Psi$" signal from the generator 144 is input to a multiplying amplifier 148 that receives the decoded LAT signal transmitted through the fiber optic slip ring from the pilot control stick. An output from each of the amplifiers 146 and 148 is summed in a summing junction 150 and the combined signal is applied to one input of a summing junction 152. The summing junction 152 also receives the decoded COLL signal representing the desired collective pitch for the rotor. The output from the summing junction 152 is a generalized control signal for one input of each of the electrohydraulic servo valves for each section of the triplex actuators 76-79. That is, the generalized control signal must now be individualized for a particular blade by introducing a phase lag and an active control signal, as will be explained.

Functionally, the circuit of FIG. 8 generates at the output of the summing amplifier 152 a signal represented by the following equation:

$$\theta = F/A \sin\Psi + LAT \cos\Psi + \theta_C \quad (1)$$

where:
$\theta$ = the generalized control signal, and
$\theta_C$ = The COLL signal.
It is this signal that is further modified and individualized for each of the rotor blade actuators by the addition of phase lag and an active control signal. Two signals, as given by equation (1) above, are generated by each of the signal generators 134, 136 and 138 for a total of six signals for the system of FIG. 7.

Returning to FIG. 7, and with particular reference to the signal generator 134, the output of the circuit of FIG. 8 is applied to a line 154 that is tied to an input of phase lag networks 156-159. As noted in the figure, the phase network 156 introduces a zero phase lag into the signal on line 154 and the phase network 157 introduces a 90° phase lag. Similarly, the phase network 158 introduces a 180° phase lag into the signal on line 154 and the phase network 159 introduces a phase lag of 270°. The signal on line 154, as output from the summing junction 152, has now been individualized in one command for each rotor blade 54-57 as shown in FIG. 3.

To further individualize the output of the summing junction 152, the output of the phase network 156 is applied to one input of a summing junction 160 which also receives an active control signal on a line 162 from an active control generator 164. To further individualize the output of the phase network 156, it is applied to one input of a summing junction 166 that receives a second input on a line 168 from an active control generator 170. The signal from the phase network 158 for one electrohydraulic servo valve of the actuator 78 is further individualized by connecting the output of the network to a summing junction 172 that receives a second input on a line 174 from an active control generator 178. For the actuator 79, the output of the phase network 159 is applied to a summing junction 180 that also receives an input on a line 182 from an active control generator 184.

Each of the active control generators 164, 170, 178 and 184 provides an individualized blade control signal for one of the actuators 76-79. With reference to the active control generator 184, the signal on the line 182 is also applied to summing junctions 186 and 188. The output of the summing junction 180 is applied to one input of the electrohydraulic servo valve for section 1 of the actuator 79 while the output of the summing junction 186 is connected to one input of the electrohydraulic servo valve for section 2 of this same actuator. The output of the summing junction 188 is applied to one input of the electrohydraulic servo valve for section 3 of the actuator 79. For the electrohydraulic servo valve of section 1 of the actuator 79, there would be two summing junctions 180. For the electrohydraulic servo valve of section 2, there would be two summing junctions 186 and for the electrohydraulic servo valve of section 3 of the actuator 79, there would be two summing junctions 188. Thus, the output of the active control generator 184 would be connected as the input to six summing junctions to individualize the six control signals applied to the actuator 79 for operation thereof. Similarly, the active control generator 164 would supply individualized blade control signals for six summing junctions for each of the six signals applied to the electrohydraulic servo valves of the actuator 76. The active control generator 170 output is connected to six summing junctions for the actuator 77 and the active control generator 178 is connected to six summing junctions for the actuator 78.

Each of the active signal control generators includes circuitry for performing a matrix gradient technique to numerically search for the optimal values of coefficients and frequencies in a generalized active control signal. This active control signal is superimposed upon the output signals from the phase networks to individualized blade control. Each of the active control generators 164, 170, 178 and 184 receives, alone or in combination, measurement signals from accelerometers mounted on an aircraft fuselage, signals from blade sensors which monitor the condition of each blade, pilot input commands and a synchronizing signal reference to the rotor mast position. Thus, the output of each of the active control generators 164, 170, 178 and 184 will represent a part of a characterizing signal for one blade of a four bladed rotor as the blade rotates in azimuth with the mast 76.

Each of the two circuits in the signal generators 134, 136 and 138 generates the output of the equation (1) and is applied to a bank of four phase shift networks. As explained, one of the circuits of the signal generator 134 generates an output on line 154 that is applied to the bank of phase shift networks 156–159. This signal, after being characterized in the phase shift networks and the summing junctions connected thereto, is applied to one of the two inputs of the electrohydraulic servo valve for section 1 of each of the actuators 76–79. The second input to the electrohydraulic servo valve of section 1 of each of the actuators 76–79 is connected to the second circuit of the signal generator 134. The same arrangement of phase shift networks and summing junctions will be interconnected between the signal generator 134 and the second input to the electrohydraulic servo valve for section 1 of each of the actuators 76–79. For simplicity in understanding the control circuitry, this duplication of components is not shown in FIG. 7.

A first circuit of the signal generator 136 also generates a signal represented by equation (1) on a line 190 that is applied to a 0° phase shift network for the actuator 76, a 90° phase shift network for the actuator 77, and 180° phase shift network for the actuator 78. In addition, a signal on the line 190 is connected to the phase shift network 196 having an output connected to the summing junction 186 for one input of the electrohydraulic servo valve for section 2 of the actuator 79. The interconnection of a phase shift network and a summing junction connected to the line 190 for each of the actuators 76–78 is also connected to one input of the electrohydraulic servo valve for the second section of the respective actuators. Again, for simplicity and to avoid over complicating the drawing, these additional phase shift networks and summing junctions are not illustrated in FIG. 7. A second circuit in the signal generator 136 generates an output on a line 194 which is connected to a bank of four phase shift networks and summing junctions with the output of each summing junction connected to the second terminal of the electrohydraulic servo valve for section 2 of each of the actuators 76–79. As explained previously, the summing junction is also connected to the respective active control generator for the respective blade.

With reference to the signal generator 138, one circuit thereof, as detailed in FIG. 8, generates an output on a line 198 as applied to a bank of phase shift networks for section 3 of each of the actuators 76–79. This bank of networks includes the phase shift network 200 having an output applied to the summing junction 188. The signal from the summing junction 188 is applied to one input of the electrohydraulic servo valve for section 3 of the actuator 79. One terminal of each of the electrohydraulic servo valves for section 3 of each of the actuators 76–78 is also connected through a summing junction and phase shift network to the line 198.

In all cases, each of the three sections of the actuator 76 is connected to a 0° phase shift network, each section of the actuator 77 is connected to a 90° phase shift network, each section of the actuator 78 is connected to a 180° phase shift network, and each section of the actuator 79 is connected to a 270° phase shift network.

In summary, the circuit, including the phase shift networks 156–159 and the summing junctions 160, 166, 172 and 180, is duplicated for section 1 of each of the actuators 76–79 and connected to the signal generator 134. The same duplication of circuit components is required for section 2 of the actuators 76–79 and connected to the signal generator 136. Section 3 of the actuators 76–79 likewise requires the duplication of the phase shift networks and summing junctions for connection to the signal generator 138.

Each of the six control signals applied to one of the actuators varies in accordance with equation (1) as output from each of the six circuits of the signal generators 134, 136 and 138. After passing the output of the circuit of FIG. 8 through the characterizing phase shift networks and summing junctions, the control signal applied to the electrohydraulic servo valves of each of the actuators 76–79 is given by the following equations:

$$\theta_{76} = F/A \sin \Psi + LAT \cos \Psi + \theta_C + \theta_{AC164} \quad (2)$$

$$\theta_{76} = F/A \sin (\Psi - 90°) + LAT \cos (\Psi - 90°) + \theta_C + \theta_{AC170} \quad (3)$$

$$\theta_{78} = F/A \sin (\Psi - 180°) + LAT \cos (\Psi - 180°) + \theta_C + \theta_{AC178} \quad (4)$$

$$\theta_{79} = F/A \sin (\Psi - 270°) + LAT \cos (\Psi - 270°) + \theta_C + \theta_{AC184} \quad (5)$$

where:

$\theta_{AC164}$ = the output of active generator 164, $\theta_{AC170}$ = the output of active control generator 170, $\theta_{AC178}$ = the output of active control generator 178, and $\theta_{AC184}$ = the output of active control generator 184.

The $\theta_{AC}$ term in each of four equations is thus the active control signal for characterizing the motion of each blade as it rotates in azimuth about the mast 75. These are the signals that are output from the active control generators 164, 170, 178 and 184. From these equations, it will be apparent that, as a blade rotates through 360° of arc, the signals applied to each of the electrohydraulic servo valves of the three sections of an actuator vary accordingly. This continually changes the pitch position of each blade in accordance with pilot input signals.

It should be understood that the system of FIG. 7 also responds to SCAS signals and autopilot signals as transmitted through the fiber optic slip ring. For simplicity of description and to facilitate an understanding of the invention, the details of how the signals are generated, which is conventional in the art, have not been described.

While only one embodiment of the invention, together with modifications thereof, has been described in detail herein and shown in the accompanying drawings, it will be evident that various further modifications are possible without departing from the scope of the invention.

We claim:

1. Apparatus for individually controlling each blade of a rotor that rotates with a mast which drives the rotor through a rotating hub, the improvement comprising:

a plurality of blade actuators mounted to rotate with the hub and individually coupled to a rotor blade for control thereof;

a plurality of power packages mounted to rotate with the rotating hub, each power package individually actuated by rotation of the hub to provide actuator power and control signals; and control channels for connecting the actuator power and control signals from each power package to each blade actuator to control blade pitch.

2. Apparatus for individual blade control as set forth in claim 1 wherein each of said plurality of power packages includes an alternator for generating electrical power to the control channels.

3. Apparatus for individual blade control as set forth in claim 1 wherein each of said power packages comprises an electrical generator and a hydraulic pump both actuated by rotation of the hub.

4. Apparatus for individual blade control as set forth in claim 1 including a plurality of signal generators responsive to pilot inputs and providing the control signals to the control channels.

5. Apparatus for individual blade control as set forth in claim 4 including means for transmitting pilot inputs between a stationary part of an aircraft and the rotating mast.

6. Apparatus for individually controlling each blade of a rotor that rotates with a mast which drives the rotor through a rotating hub, the improvement comprising:

a plurality of blade actuators mounted to rotate with the hub and independently coupled to a rotor blade for control thereof, each actuator individually controlled;

power generating means mounted to rotate with the hub and providing actuator power and control signals for each section of said plurality of blade actuators; and control channels for connecting a control signal and actuator power to the individual actuators in accordance with pilot inputs.

7. Apparatus for individual blade control as set forth in claim 6 including a standpipe mounted in a fixed position relative to the rotating hub and having an end terminating in proximity thereto, said standpipe coupled to said power generating means to provide actuation thereof in combination with the rotating hub.

8. Apparatus for individual blade control as set forth in claim 7 including a coupling having a stationary element mounted to said standpipe and a rotating element mounted to the mast for transmitting pilot inputs between the standpipe and the mast for coupling to said power generating means.

9. Apparatus for individual blade control as set forth in claim 6 wherein said power generating means includes a power package for each actuator to provide both pressurized hydraulic fluid and control signals to each such actuator.

10. Apparatus for individual blade control as set forth in claim 9 wherein each power package includes a signal generator including a blade position sensor and responsive to pilot inputs for generating control signals to the same actuator for each of the plurality of blade actuators.

11. Apparatus for individual blade control as set forth in claim 6 including a hub spinner mounted to rotate with the hub and enclosing said blade actuators, power generating means and control channels, said spinner including passageways for returning actuator fluid from said actuators to said power generating means.

12. Apparatus for individually controlling each blade of a rotor that rotates with a mast which drives the rotor through a rotating hub, the improvement comprising:

a plurality of blade actuators mounted to rotate with the hub and individually coupled to a rotor blade for control thereof in accordance with an applied blade control signal; and power generating means mounted to rotate with the hub and providing actuator power and a control signal in response to an applied input for each of said plurality of blade actuators, said blade generating means including:

means for generating a blade position signal that varies with the position of the blade as the hub rotates with the mast;

means for combining the blade position signal and the applied input to generate an output signal that varies therewith; and means for characterizing the output of said means for combining for each individual blade to generate the blade control signals.

13. Apparatus for individual blade control as set forth in claim 12 wherein said means for characterizing includes a phase network for applying a phase difference to the individual blade control signals.

14. Apparatus for individual blade control as set forth in claim 13 wherein said means for characterizing further includes means for combining an active control signal with the output of said phase network.

15. Apparatus for individually controlling each blade of a rotor that rotates with a mast which drives the rotor through a rotating hub, the improvement comprising:

a plurality of blade actuators mounted to rotate with the hub and independently coupled to a rotor blade for control thereof, each actuator individually controlled in accordance with an applied blade control signal; and power generating means mounted to rotate with the hub and providing actuator power and control signals for each of said plurality of blade actuators, said power generating means including:

a plurality of signal generating means, each signal generating means responsive to the position of the blades as the hub rotates with the mast to individually generate a blade position signal for each of said plurality of blade actuators, each signal generating means including means for combining the blade position signal and an applied input to generate an output signal that varies therewith; and means for characterizing the output of each of said means for combining for individually characterizing each blade control signal for each of said plurality of the blade actuators.

16. Apparatus for individual blade control as set forth in claim 15 wherein said means for characterizing includes a phase network for applying a phase difference to the individual blade control signals.

17. Apparatus for individual blade control as set forth in claim 15 wherein said means for characterizing includes means for combining an active control signal with the output of each said means for combining.

18. Apparatus for individual blade control as set forth in claim 15 wherein said blade actuators have multiple sections with each section including an electrohydraulic servo valve, and wherein said signal generating means includes multiple signal generators each generating an individual blade control signal for one section of each of said plurality of actuators.

19. Apparatus for individual blade control as set forth in claim 18 wherein the inputs applied to each of said signal generating means is coupled to said rotating hub through a fiber optic slip ring.

* * * * *